Figure 1:
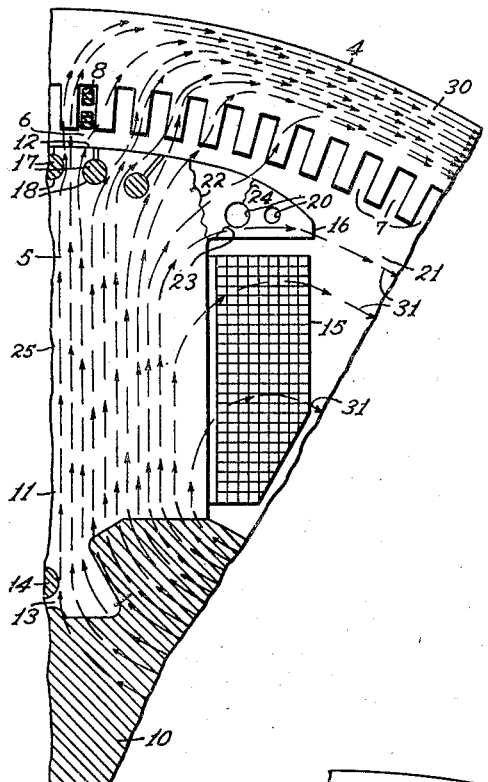

Sept. 14, 1948.  E. I. POLLARD  2,449,506
POLE TIP STRUCTURE FOR SALIENT
POLE SYNCHRONOUS MACHINES
Filed Aug. 18, 1945

WITNESSES:
Edward Michaels
Rev. L. Groome

INVENTOR
Ernest I. Pollard.
BY O. B. Buchanan
ATTORNEY

Patented Sept. 14, 1948

2,449,506

UNITED STATES PATENT OFFICE 2,449,506

POLE TIP STRUCTURE FOR SALIENT POLE SYNCHRONOUS MACHINES

Ernest I. Pollard, Wilkinsburg, Pa., assignor to Westinghouse Electric Corporation, East Pittsburgh, Pa., a corporation of Pennsylvania Application August 18, 1945, Serial No. 611,416

2 Claims. (Cl. 171—252)

My invention relates to salient-pole synchronous dynamo-electric machines, particularly special machines designed for use as ship's-service generators, such as are used for general ships'-service power-requirements other than propulsion.

The general object of my invention is to provide a novel construction which reduces the saturated transient reactance of a salient-pole synchronous machine.

The saturated transient reactance is a measure of the dip in the terminal voltage, resulting during the first second, or a few seconds, after a heavy load is suddenly thrown on a generator, such as when a large turret-training motor, or a large steering-gear motor, is started on a ships'-service polyphase electric-power system. Such a voltage-dip is undesirable, because it results in lamp-flicker, and it may, if excessive, cause motors to be tripped off, but principally it is undesirable because it disturbs the performance of radar equipment. A great deal of effort has been devoted to reduction of voltage-dip, through improvements in the designs of exciters, regulators, generators, and ships'-service systems.

The most important generator-characteristics which affect the magnitude and the duration of the voltage-dip are the transient reactance $x'_d$ and the open-circuit time-constant $T_{do}$. Of these two, $x'_d$ alone practically determines the magnitude of the dip, so that a low value of $T_{do}$ is not of great importance. The magnitude of the voltage-dip, when starting a motor of a given size, from a ships'-supply system energized by a synchronous generator, can be reduced by reducing the transient reactance $x'_d$ of the generator, or by resorting to a generator of a larger rating, or by reducing the operating-time of the voltage-regulator which controls the generator, or by increasing the speed of response of the exciter which energizes the field-windings of the generator. It is desirable, therefore, that the transient reactance of the generator be low, a value under 21% being sometimes specified.

The subtransient reactance $x''_d$ of the generator is a measure of the magnitude of the current that would have to be interrupted by the circuit-breakers. This reactance is affected less by saturation, and it is smaller than the unsaturated transient reactance, because of the effect of the damper-bars during the first two or three cycles of the transient. In large generators, a high value of the sub-transient reactance is desirable, in order to keep down the current which must be interrupted in the event of a short-circuit, so as to be able to use breakers of minimum size. A subtransient reactance greater than 13.2% is sometimes specified, at the same time that a transient reactance under 21% is desired, thus presenting conflicting requirements which have heretofore been difficult or well-nigh impossible of fulfillment.

The general and quantitative effects of saturation, on the internal impedances or reactances of synchronous machines, have been well known and analyzed since Kilgore's paper on "The effects of saturation on machine reactances," in A. I. E. E., May, 1935, page 545. As stated in this paper, an average value of the saturated transient reactance of salient-pole machines of previously known designs, for transients involving currents of from 1 to 3 times the rated current, at full voltage, is 0.895 times the unsaturated transient reactance which is obtained at half-voltage. However, the Kilgore paper was devoted exclusively to studying and explaining the discovered phenomena, without examination of the possibilities as to what could be done to change these phenomena.

An important part of the transient reactance of a salient-pole synchronous machine is the field-leakage part, which is caused by leakage-flux in the space between adjacent poles. A substantial part of the transient reactance due to this leakage-flux is due to the leakage between adjacent pole-tips. It has been known that, for saturated conditions, such as for a short-circuit at rated voltage, the pole-tips tend to saturate, thereby reducing the field-leakage flux and the transient reactance.

However, heretofore, the radial thickness or cross-sectional area of the overhanging pole-tip portions of the salient poles of rotating-field salient-pole generators has been controlled by various factors, such as considerations of mechanical strength, for withstanding the shearing forces due to centrifugal action, tending to break off the pole-tips; and the contours of the tips have been dictated by the necessity for properly distributing the airgap flux of the machine. The dimensions of the pole-tip portions are, therefore, fairly well fixed, and frequently can not feasibly be changed.

My present invention relates to a novel form of the pole-tip portion, in which one or more holes or openings are provided, in the magnetic material thereof, for reducing the effective magnetic cross-section of the tip in an amount sufficient to produce an effectively increased transient-reactance saturation, with respect to leakage-flux flowing circumferentially within the tip and thence across the interpolar spaces between the pole-tips, during transient conditions. These pole-tip holes can be placed in such positions that they do not impair the mechanical strength, which is to say that the cross-section at the base of the tip is not affected, but the cross-section of the tip is reduced at points further out along the tip, thus materially increasing the tip-saturation effects beyond the effects previously obtainable, and considerably increasing the ratio of the subtransient reactance to the transient reactance of the machine.

When damper-bars are omitted from the pole-tips, the difference between the reciprocals of the transient and subtransient reactances is not particularly affected by pole-tip saturation, because this difference is determined by the effect of the bars near the pole-center on the flux-distribution in that portion, rather than by the flux-distribution in the pole-tips, as will be subsequently explained more in detail. Hence, my invention provides a means for considerably increasing the ratio of subtransient to transient reactances. Thus, it is possible for a machine to be produced, having improved characteristics, without necessitating an increase in the size of the machine to obtain those characteristics. My invention is particularly effective in designs in which, in order to increase the subtransient reactance, the damper-bars are bunched close to the center-line of the pole.

Figure 2:
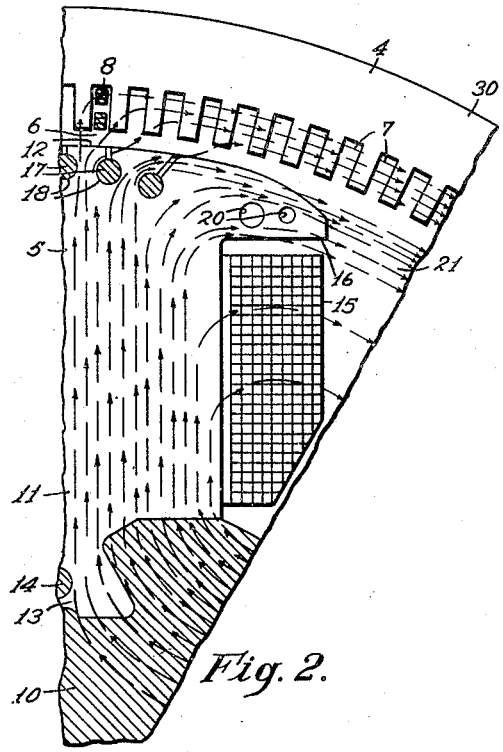
Figure 3:
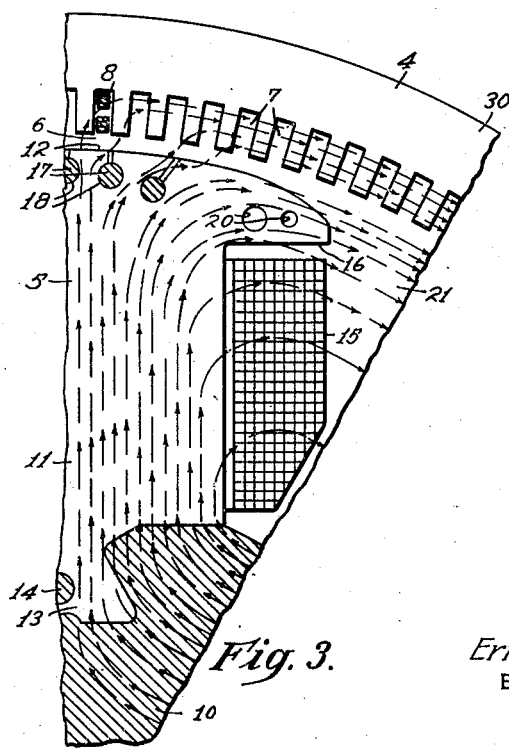

With the foregoing and other objects in view, my invention consists in the structure, combinations, parts, systems and methods hereinafter described and claimed, and illustrated in the accompanying drawing, in which the three figures are fragmentary diagrammatic end-views of a half of a pole of a synchronous machine embodying my invention, with three different flux-distribution conditions, Figure 1 depicting the no-load flux-distribution, Fig. 2 depicting the short-circuit flux-distribution during the continuance of the subtransient effect, and Fig. 3 depicting the short-circuit flux-distribution illustrative of the transient effect.

My invention is illustrated as being applied to a six-pole, rotating-field, salient-pole, three-phase synchronous generator, which is shown only fragmentarily in the drawing, and which comprise a stator-member 4, which is the armature-member of the machine, and a rotor-member 5, which is the field-member of the machine, with an airgap 6 in between the two members. The stationary armature-member 4 comprises a laminated magnetizable annular core-member, having winding-receiving slots 7 therein, with an armature-winding 8 carried by the slots, the armature-winding being broken away from all but one of the slots, for clearness of illustration.

The rotating field-member 5 comprises a rotatable shaft 10 to which are keyed six salient pole-pieces 11, only one-half of one pole being shown in each figure of the drawing. Each salient pole-piece 11 is made of laminated magnetizable material. It has a pole-face portion 12 adjacent to the airgap 6, this pole-face portion being suitably contoured for distributing the flux, as is well known. Each pole-piece also has a shank-portion 13, which is keyed to the shaft, as shown at 14, and which carries a field-coil or winding 15. The pole-face portion 12 includes two substantially identical pole-tips 16, overhanging the shank-portion in a circumferential direction, one pole-tip 16 being disposed on either side of the shank 13. The tops of these pole-tip portions 16 merge into the central portion of the contoured or curved pole-face portion 12, while the bottoms or back sides of the pole-tip portions 16 are flat, to serve as abutments for retaining the field-coil 15.

The pole-face portion 12 also carries damper-bars 17, which are disposed in suitable slots 18 in the pole-face portion. In a machine in which it is desired to have as high a subtransient reactance as possible, it has been customary to put these damper-bars 17 only in the central portions of the pole-face portion 12, and not in the pole-tip portions 16, and it has also been customary to put the damper-bar slots 18, particularly the end-slots of each group, at a considerable depth down from the airgap 6, as shown in the drawing. In other machines, however, the damper-bars 17 are disposed all along the pole-face portion 12, including the pole-tips 16; and while my present invention is particularly applicable to the high-subtransient machines, it is nevertheless applicable also to machines having the more widely distributed damper-bars 17.

In accordance with my present invention, I provide each pole-tip portion 16 with one or more openings 20 in the magnetic material thereof. These holes or openings 20 are provided in addition to any damper-bar slots or holes 18 which may be provided, and in addition to any rivet-holes (not shown) or any other openings such as might otherwise be provided. My special pole-tip openings 20 are of such shape and size as to reduce the effective magnetic cross-section of the tip 16, in an amount which is sufficient to produce an effectively increased transient-reactance saturation, with respect to leakage-flux which flows circumferentially within the tip 16 and thence across the interpolar spaces 21 between the pole-tips of adjacent poles, during transient conditions.

Since the purpose of the special pole-tip holes 20 is to reduce the magnetic cross-section with respect to laterally or circumferentially flowing flux, it is not necessary to put these special openings 20 at a place where they would critically weaken the pole-tip 16, or impair its mechanical strength. In designing the pole-piece, it is necessary to design the pole-tips 16 so as to have an adequate radial thickness at the bases of the tips, where they join onto the shank-portion 13, as the centrifugal forces which tend to shear or break off the pole-tips tend to cause breakage at the bases of the tips, as indicated at 22 in Fig. 1. It is desirable, and possible, in carrying out my invention, to put the special saturation-producing tip-openings 20 far enough out on the tips, away from the bases of the tips, so as not to produce new shearage-sections 23—24 which are sufficiently short, radially, to critically reduce the mechanical strength of the tips, in resisting centrifugal force.

It will be understood that the pole-pieces are symmetrical with respect to the centerline 25 of the pole, as is customary in synchronous generators.

The purpose and effect of my special pole-tip holes 20 will best be understood by considering the progressive changes in the distribution of the useful flux and the leakage-flux after the application of a short-circuit or other sudden increase in loading. While the general basic ideas of the progressively shifting flux-distribution during transients, has long been known, since at least as early as Kilgore's 1935 paper, the possibility and advantage of obtaining increased pole-tip saturation without impairing the mechanical strength of the tips, has not been recognized and exploited in designs where the radial depth of the tips is made as small as mechanical considerations will permit, or, in general, where a determined effort is made to reduce the transient reactance of the machine without as greatly reducing the subtransient reactance thereof.

Fig. 1 is for an open-circuit or lightly-loaded condition of the machine, and it shows the distribution of the useful flux and the leakage-flux, when the field-winding 15 is normally excited. The useful flux is the flux which crosses the airgap 6 and links the armature-winding 8, and then passes circumferentially around the stator-member 4 to the next pole, as indicated at 30 in Fig. 1. This is the flux which generates the rated armature-voltage at the terminals of the machine. The remaining flux is the leakage-flux, as shown at 31 in Fig. 1.

When the terminals of the machine are suddenly short-circuited, the terminal-voltage becomes substantially zero, and the internal voltage which is generated in the armature-windings 8 must be consumed by the internal reactance-drop inside the machine. The initial value of the internal machine-reactance, under such conditions, is defined as the subtransient reactance $x''_d$ of the machine. Since the armature-resistance is low, compared with its reactance, the power-factor of the short-circuit current is approximately zero, and lagging with respect to the induced voltage, so that the magnetomotive force of the armature-reaction is at its maximum value at the centerline 25 of each field-pole, and is demagnetizing with respect to the field, and the short-circuit current is a direct-axis current. This demagnetizing armature-reaction attempts to instantly reduce the flux in the machine, but flux represents energy, and can not be changed instantly. Consequently, induced currents simultaneously appear, in the field-windings 15 and in the damper-windings 17, opposing any change in the amount of flux which links with either one of these windings.

Fig. 2 is drawn for the first instant after the short-circuit, and it represents the distribution of flux in the machine at this instant. The amount of flux linking the field-windings 15 and the damper-windings 17 is the same as in Fig. 1 before the short-circuit, but most of the useful flux has been shifted, from the portion 30 of the armature-core which is back of the armature-slots 7, to a leakage-path which is bounded laterally by the damper-bars 17 and the armature-winding 8, respectively, said leakage-path causing the flux to flow circumferentially through the pole-tips 16, and across the interpolar spaces 21, as shown in Fig. 2. Since the reluctance of this leakage-path is usually several times that of the normal flux-path across the airgap 6 and thence through the stator-core 4, a relatively high short-circuit current, of several times the normal full-load current-value, must flow in the armature-winding 8 in order to transfer the flux from the armature-core 4 to the leakage-path of higher reluctance, as shown at 21 in Fig. 2.

During the conditions depicted in Fig. 2, currents are induced in both the damper-windings 17 and the field-windings 15, resulting in $I^2R$ losses, in these windings, which dissipate, as heat, the energy which was stored in the magnetic field of the machine. As this stored magnetic energy is diminished, the linkage of flux with the damper- and field-windings is permitted to change. The first change occurs in the flux which interlinks with the damper-winding 17, because this winding has a relatively small total cross-sectional area, as compared to the total cross-sectional area of the field-winding 15. The stored magnetic energy of the flux which originally interlinked with the damper-winding 17 is thus transformed quite rapidly into heat in the damper-bars, thus permitting the flux-interlinkage in the damper-windings to decrease to a very low value during the subtransient-reactance period, lasting for anywhere from a cycle to several cycles of time, on the basis of the alternating-current frequency of the machine.

As the flux which interlinks with the damper-windings 17 decreases, the damper-windings become substantially ineffectual, which means that the major portion of the flux is no longer crowded through the high-reluctance leakage-path which is laterally bounded by the damper-bars 17 and the armature-conductors 8, as shown at 21 in Fig. 2. On the contrary, practically all of the flux of the machine becomes a leakage-flux, as shown in Fig. 3, which spreads out freely across all of the radial cross-section of the pole-tips 16, in a new leakage-flux path of lower reluctance, approaching the reluctance of the space between the pole-tips 16 of adjacent poles. The subtransient reactance-effects of Fig. 2 are over, within a few cycles after the application of the short-circuit, and then the conditions are approximately as depicted in Fig. 3.

Obviously, as is well known, if the damper-bars 17 are concentrated near the centerline 25 of the pole, rather than being distributed over the whole airgap surface or pole-face 12 of the pole, the subtransient effect of the damper-bars is to prevent a smaller proportion of the total flux from shifting at the first instant of short-circuit. Other conditions being the same, this results in a higher value of the subtransient reactance $x''_d$. An increase in the subtransient reactance $x''_d$ is also obtained by burying the damper-bars 17 deeper below the surface of the pole, or below the pole-face 12, because the deeper position of the damper-bars increases the effective cross-section, and hence reduces the reluctance, of the subtransient leakage-path 21 of Fig. 2, because that path is composed of the radial space between the damper-bars 17 and the armature conductors 8. Both of these methods have been employed to increase the subtransient reactance $x''_d$ of the larger ratings of ships'-service generators, in order to reduce the size of the circuit-breakers (not shown), which are required to interrupt the short-circuit current.

After the damper-bars 17 have become substantially ineffectual, at the termination of the subtransient period within a few cycles after the application of the short-circuit, the conditions shown in Fig. 3 prevail, and most of the flux which then remains in the machine is distributed across a leakage-path which is laterally bounded by the field-coil 15 and the armature-coils 8, respectively, this leakage-flux extending circumferentially from pole to pole, as indicated in Fig. 3. The flux in the machine now diminishes at a rate which is determined by the rapidity with which the stored magnetic energy of the flux can be converted into heat by the $I^2R$ losses in the field and armature coils 15 and 8. Since the area of copper in the field-coil 15 is much greater than the effective area of the damper-bars 17, the rate of decay of the flux is now much slower than during the subtransient period, and the final decay of the flux requires a much longer time, known as the transient period, and usually lasting for a second or several seconds, depending upon the design.

During this transient period, as depicted in Fig. 3, while the current which is induced in the field-winding 15 is dying out, the distribution of the flux remains substantially the same, as depicted in Fig. 3, with the flux merely diminishing gradually in its magnitude. If the exciter-voltage which is applied to the field-windings 15 has not been changed during the transient, the final value of the field-current is the same as the direct-current value before the short-circuit was applied to the machine. The final or sustained value of the armature-current is merely the current sufficient to prevent more flux-linkage than is required to generate an armature-conductor voltage equivalent to the $Ix'_d$ internal-impedance drop of the armature-winding itself.

The effectiveness of my special saturation-producing pole-tip openings 20 will be apparent from the foregoing representation of the flux-distribution conditions, and particularly from a comparison of the flux-leakage path 21 of Fig. 2 with the much more spread-out flux-leakage path which is shown in Fig. 3.

During the subtransient time, as shown in Fig. 2, most of the flux is crowded out toward the air-gap-edge of the pole-tip portions 16, by reason of the damper-winding effect which causes most of the flux to continue to interlink the damper-bars 17, before beginning to leak circumferentially in the path indicated at 21 in Fig. 2. This effect of the damper-bars is even more noticeable, in machines in which the damper-bars 17 are disposed all along the pole-face portion 12, extending out into the pole-tip portions 16, as well as over the central portions of the pole-face 12. By reason of the restricted cross-sectional area of the subtransient leakage-flux, which has to pass through the damper-windings before it can begin to leak off in a circumferential direction, this subtransient leakage-flux path is always considerably saturated, so that the subtransient leakage-path inherently has a considerable reluctance, due to saturation, as well as due to the restriction of the radial cross-section of the leakage-path.

In Fig. 3, however, the leakage-flux is substantially free to spread itself out uniformly over the entire radial cross-section of the pole-tips, so that, without my special saturation-producing tip-openings 20, there is relatively little saturation of the magnetic material of the pole-tips 16. Hence, in all previously known designs, the reluctance of the transient leakage-path which is shown in Fig. 3 has been considerably smaller than the subtransient reluctance of Fig. 2, not only because of an increase in the effective cross-sectional area of the leakage-path, but also because of a considerably reduced amount of saturation.

The effect of my invention, in deliberately introducing the saturation-producing openings 20, which are added, over and above any other openings which might be provided in the pole-tips 16, will now be readily apparent. These saturation-producing pole-tip openings 20 are added for the sole purpose of reducing the effective radial cross-sectional area to circumferentially flowing leakage-flux. In this manner, I am enabled to materially increase the reluctance of the transient leakage-flux path, thus materially decreasing the transient reactance. It will further be noted, that I have produced this effect without as greatly affecting the subtransient reactance, and also without critically affecting the mechanical strength of the pole-tips.

I claim as my invention:

1. A salient-pole synchronous dynamo-electric machine comprising a stator-member and a rotor-member, with an airgap in between, said stator-member being an armature-member having an armature-winding, and said rotor-member being a salient-pole field-member having a plurality of salient pole-pieces made of magnetizable material, each pole-piece having a pole-face portion adjacent to the airgap, and having also a shank-portion, the pole-face portion including two substantially identical pole-tips overhanging the shank-portion, one on either side thereof, damper-bars in the central portion of the pole-face portion but not in the pole-tips, and a field-winding on the shank-portion of each pole-piece; characterized by each pole-tip having one or more openings in the magnetic material thereof for reducing the effective magnetic cross-section of the tip in an amount sufficient to produce an effectively increased transient-reactance saturation with respect to leakage-flux flowing circumferentially within the tip and thence across the interpolar spaces between the pole-tips during transient conditions; the pole-face portion, including the tips, of each pole-member having a flux-distributing contour which is symmetrical with respect to the centerline of the pole.

2. A salient-pole synchronous dynamo-electric machine comprising a stator-member and a rotor-member, with an airgap in between, said stator-member being an armature-member having an armature-winding, and said rotor-member being a salient-pole field-member having a plurality of salient pole-pieces made of magnetizable material, each pole-piece having a pole-face portion adjacent to the airgap, and having also a shank-portion, the pole-face portion including two substantially identical pole-tips overhanging the shank-portion, one on either side thereof, damper-bars carried by each pole-face portion, and a field-winding on the shank-portion of each pole-piece; characterized by each pole-tip having one or more saturation-increasing openings in the magnetic material thereof for reducing the effective magnetic cross-section of the tip in an amount sufficient to produce an effectively increased transient-reactance saturation with respect to leakage-flux flowing circumferentially within the tip and thence across the interpolar spaces between the pole-tips during transient conditions; said saturation-increasing pole-tip openings having no damper-bars therein; and the pole-face portion, including the tips, of each pole-member having a flux-distributing contour which is symmetrical with respect to the centerline of the pole.

ERNEST I. POLLARD.

REFERENCES CITED

The following references are of record in the file of this patent:

UNITED STATES PATENTS

| Number | Name | Date |
| --- | --- | --- |
| 1,495,969 | Alexanderson | May 27, 1924 |